United States Patent
Khande et al.

(10) Patent No.: US 10,089,042 B2
(45) Date of Patent: Oct. 2, 2018

(54) SYSTEM AND METHOD FOR DISCOVERING A VIRTUAL DISK SPANNED ACROSS INDEPENDENT STORAGE CONTROLLERS

(71) Applicant: Dell Products, LP, Round Rock, TX (US)

(72) Inventors: Abhijit R. Khande, Bangalore (IN); Anirban Kundu, Bangalore (IN); Ragendra K. Mishra, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 176 days.

(21) Appl. No.: 14/597,801

(22) Filed: Jan. 15, 2015

(65) Prior Publication Data
US 2016/0210057 A1 Jul. 21, 2016

(51) Int. Cl.
*G06F 12/00* (2006.01)
*G06F 3/06* (2006.01)

(52) U.S. Cl.
CPC .......... *G06F 3/0665* (2013.01); *G06F 3/0605* (2013.01); *G06F 3/0632* (2013.01); *G06F 3/0689* (2013.01)

(58) Field of Classification Search
CPC .... G06F 3/0665; G06F 3/0689; G06F 3/0605; G06F 3/0632; G06F 12/0223; G06F 2003/0697; G06F 3/0604; G06F 3/0608; G06F 3/0647; G06F 3/065; G06F 3/0683
See application file for complete search history.

(56) References Cited

U.S. PATENT DOCUMENTS

| | | | |
|---|---|---|---|
| 5,671,439 A | 9/1997 | Klein et al. | |
| 5,809,516 A | 9/1998 | Ukai et al. | |
| 6,260,109 B1 | 7/2001 | Ofer et al. | |
| 7,415,593 B2 * | 8/2008 | Mashima | G06F 3/0613 711/112 |
| 8,051,225 B2 * | 11/2011 | Kambayashi | G06F 3/0604 710/38 |

(Continued)

OTHER PUBLICATIONS

Enhancing Storage Performance and Investment Protection Through RAID Controller Spanning, White Paper, Broadcom Corporation, RAID-CSpan-WP100-R, May 2005, pp. 1-10.

(Continued)

*Primary Examiner* — Mardochee Chery
(74) *Attorney, Agent, or Firm* — Larson Newman, LLP (57) ABSTRACT

An information handling system includes a first storage controller coupled to a first storage device, a second storage controller coupled to a second storage device where the first storage device and the second storage device comprise a virtual disk and a processor to initiate a first discovery of the first storage device, initiate a first discovery of the virtual disk on the first storage controller, complete the discovery of the first storage device, initiate a first discovery of the second storage device, initiate a second discovery of the virtual disk on the second storage controller, determine that a first timeout for the first discovery of the virtual disk on the first storage controller will expire prior to completing the first discovery of the second storage device, and initiate a second discovery of the first storage device in response to determining that the timeout will expire.

20 Claims, 3 Drawing Sheets

(56) References Cited

U.S. PATENT DOCUMENTS

| | | | |
|---|---|---|---|
| 2009/0132765 A1* | 5/2009 | Wang .................. | G06F 11/2089 711/120 |
| 2010/0250832 A1* | 9/2010 | Zhang ................. | G06F 11/1441 711/103 |
| 2014/0380006 A1* | 12/2014 | Maeda .................. | G06F 3/0683 711/162 |

OTHER PUBLICATIONS

"THG Pushes Broadcom's RAIDCore Storage Controller Envelope," Patrick Schmid, Tom's Hardware, Oct. 6, 2004, pp. 1-3; http://www.tomshardware.com/reviews/thg-pushes-broadcom,894.html.

* cited by examiner

SYSTEM AND METHOD FOR DISCOVERING A VIRTUAL DISK SPANNED ACROSS INDEPENDENT STORAGE CONTROLLERS

FIELD OF THE DISCLOSURE

This disclosure generally relates to information handling systems, and more particularly relates to discovering a virtual disk spanned across independent storage controllers.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
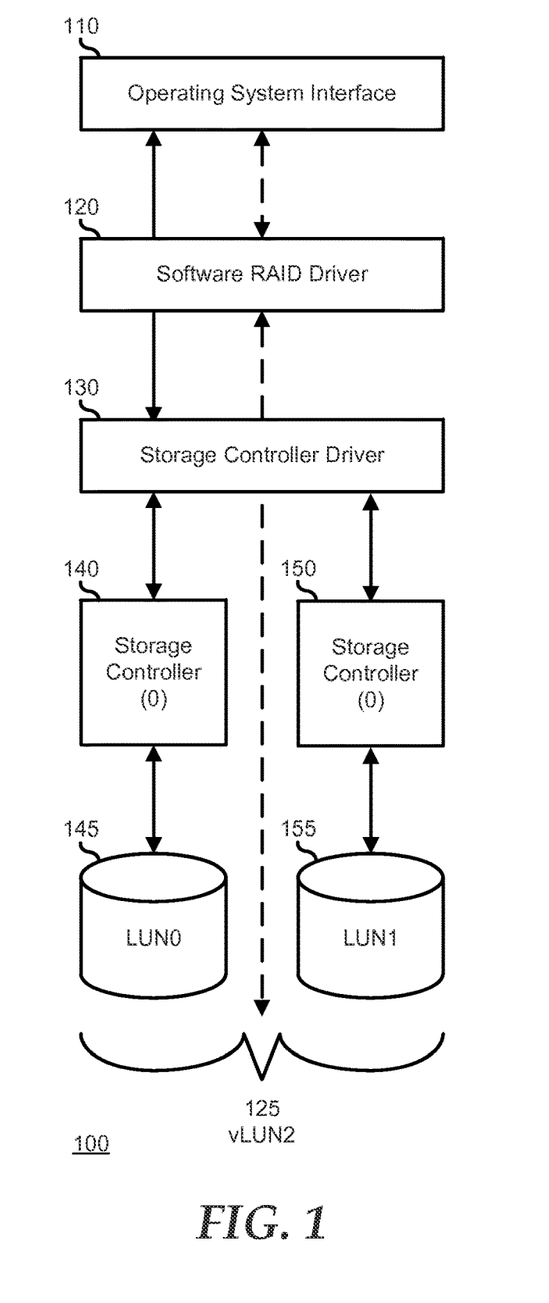
FIG. 1 illustrates an information handling system according to an embodiment of the present disclosure.

FIG. 1 illustrates an embodiment of an information handling system 100. For purpose of this disclosure information handling system 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes an operating system (OS) interface 110, a software RAID driver 120, a storage controller driver 130, storage controllers 140 and 150, and storage devices 145 and 155. OS interface 110 represents a storage class driver that operates to control the storage functions of information handling system 100 after the information handling system is powered on and control of the information handling system is passed to an OS. In particular, OS interface 110 operates to initialize the storage stack of information handling system 100, including software RAID driver 120, storage controller driver 130, storage controllers 140 and 150, and storage devices 145 and 155.

Storage controller 140 is connected to storage device 145 to control storage operations on the storage device, such as data reads and writes, control operations, and the like. Similarly, storage controller 150 is connected to storage device 155 to control storage operations on the storage device. Storage controller driver 130 operates to provide an interface between storage controllers 140 and 150 and OS interface 110 such that the OS interface can interact with storage devices 145 and 150 to perform data storage operations on information handling system 100. For example, OS interface 110 can operate to initialize storage controllers 140 and 150, to identify that storage devices 145 and 155 are attached to the information handling system, to read and write data from the storage devices, such as an OS boot loader, other firmware for other devices of the information handling system, or other data as needed or desired, or to perform other storage operations. In particular, OS interface 110 can be configured to provide one or more operations in a predetermined format, and storage controller driver 130 can be configured to receive the operations and to translate the operations into one or more commands to direct storage controllers 140 and 150 to perform the original operations on respective storage devices 145 and 155. As illustrated herein, interactions between OS interface 110 and storage devices 145 and 155 that are controlled via storage controller driver 130 are illustrated with solid lines between the OS interface, storage controller driver 130, storage controllers 140 and 150, and the storage devices. An example of storage controllers 140 and 150 include a Serial AT Attachment (SATA) controller, a Small Computer System Interface (SCSI) controller, a FibreChannel controller, another storage controller, or a combination thereof, and can include a controller integrated with a main board or a daughter board of information handling system 100, an installed device such as a Network Interface Card (NIC), a Host Bus Adapter (HBA), or the like.

Software RAID driver 120 operates to set up and operate one or more RAID arrays on information handling system 100, such as a virtual disk 125 that is provided across storage devices 145 and 155, and to provide an interface between the virtual disk and OS interface 110 such that the OS interface can interact with the virtual disk to perform data storage operations on information handling system 100. For example, OS interface 110 can operate to launch software RAID driver 120, to identify that virtual disk 125 is attached to the information handling system, to read and write data from the virtual disk, such as an OS boot loader, other firmware for other devices of the information handling system, or other data as needed or desired, or to perform other storage operations. In particular, OS interface 110 can be configured to provide one or more operations in a predetermined format, and software RAID driver 120 can be configured to receive the operations and to translate the operations into one or more commands to direct storage controllers 140 and 150 to perform the original operations on respective storage devices 145 and 155. As illustrated herein, interactions between OS interface 110 and storage devices 145 and 155 that are controlled via software RAID driver 120 are illustrated with dashed lines between the OS interface, software RAID driver 120, storage controllers 140 and 150, and the storage devices. Virtual disk 125 represents a storage array that is in conformance with a RAID type, such as a RAID 1 array that mirrors a common set of data on both storage devices 145 and 155, one of the striping RAID types, such as RAID 2, RAID 3, RAID 4, RAID 5, or RAID 6 that stripes data across the storage devices, or another type of RAID such as a hybrid RAID array that both stripes and mirrors data on the storage devices, as needed or desired. As such, software RAID driver 120 operates to partition storage devices 145 and 155 as necessitated by the particular RAID type desired.

In a particular embodiment, software RAID driver 120 presents a monolithic view of virtual disk 125 to OS interface 110, such that, from the perspective of the OS interface, the virtual disk appears no differently than other storage devices of information handling system 100, such as storage devices 145 and 155. For example, as illustrated, storage devices 145 and 155 are SCSI storage devices which each include a unique Logical Unit Number (LUN), with storage device 145 being designated as LUN0, and with storage device 155 being designated as LUN1. Here, virtual disk 125 can be provided with a LUN from software RAID controller 120, such that the virtual disk is designated as vLUN2. In this embodiment, OS interface 110 will be configured to direct data storage operations that are targeted to storage devices 145 and 155 to software RAID driver 120 using the virtual LUN (vLUN2). Here, data storage operations that are identified as being targeted to either LUN0 or LUN1, that is, to either one of storage devices 145 or 155 as individual storage devices, will be disregarded by software RAID driver 120.

In another embodiment, not illustrated, software RAID driver 120 presents the monolithic view of virtual disk 125 to OS interface 110, by providing the virtual disk with the LUN associated with one of storage devices 145 (LUN0) or 155 (LUN1). Here, OS interface 110 will be configured to direct data storage operations that are targeted to virtual disk 125 to a selected on of storage devices 145 or 155, and data storage operations that are identified as being targeted to the other LUN, that is, to the other one of storage device 145 or 155 as an individual storage device, will be disregarded by software RAID driver 120. In a particular embodiment, software RAID driver 120 utilizes some or all of the functionality of storage controller driver 130. In another embodiment, software RAID driver 120 is completely substituted for storage controller driver 130, and thereby operates as a separate storage controller driver. In yet another embodiment, software RAID driver 120 and storage controller driver 130 represent a single driver element that performs the functions of both the software RAID driver and the storage controller driver. However, for clarity of illustration, software RAID driver 120 and storage controller driver 130 will be dealt with as separate elements.

OS interface 110 discovers and initializes storage controller 140 separately from storage controller 150. As such, in either the embodiment where virtual disk 125 has a separate LUN from storage devices 145 and 155, or in the embodiment where the virtual disk shares a LUN with one of the storage devices, the virtual disk cannot be enumerated to the OS interface until both of storage controllers 140 and 150 are discovered and initialized. For example, OS interface 110 can start by initializing storage controller 140 via storage controller 130, and can proceed to initiate SCSI discovery and initialization on the storage controller via software RAID driver 120, using, for example, the following pseudo-code:

```
INITIALIZE (storage controller 140)
REPORT_LUN 0xa0 for PathId 0 and TargetID 0-127
If REPORT_LUN succeeded, Then INQUIRY 0x12 for each TargetID
If INQUIRY succeeded, Then ... (Initialize storage device 145)
INITIALIZE (storage controller 150)
REPORT_LUN 0xa0 for PathId 0 and TargetID 0-127
If REPORT_LUN succeeded, Then INQUIRY 0x12 for each TargetID
If INQUIRY succeeded, Then ... (Initialize storage device 155)
```

As such, a configuration such as the configuration presently illustrated, where virtual disk 125 is spanned across separate storage devices 145 and 155 that are each controlled by separate storage controllers 140 and 150 runs a risk of experiencing a time out condition in initializing the virtual disk. In particular, virtual disk 125 cannot be discovered until both storage controllers 140 and 150 are discovered and initialized. In some instances, the failure to discover virtual disk 125 is a fatal condition, causing information handling system 100 to fail to boot, or to crash. For example, where an OS image is stored on virtual disk 125, the failure to discover the virtual disk will result in a boot failure.

In a particular embodiment, when OS interface 110 initializes software RAID driver 120 but not all of storage controllers 140 and 150 have been initialized, that is, when the software RAID driver is unable to report the presence of virtual disk 125, the software RAID driver periodically sends a notification to the OS interface indicating that there has been a bus change on one of the initialized storage controllers. The notification to OS interface 110 causes the OS interface to reinitialize the identified storage controller 140 or 1150 and to re-initiate SCSI discovery on software RAID driver 120, thereby resetting any timer that would otherwise result in a timeout of the RAID discovery. Software RAID driver 120 will continue to periodically send notifications to OS interface 110 until such time as the uninitialized storage controller 140 or 150 is initialized. In this way, software RAID driver 120 ensures that all storage controllers 140 and 150 are initialized before the timeout of the RAID discovery, and the software RAID driver may then initialize virtual disk 125 and correctly report the existence of the virtual disk to OS interface 110.

For example, when OS interface 110 directs storage driver 130 to initialize storage controller 140 and initiates the RAID discovery on storage device 145, the storage controller will return a reply, such as SENSEINFO SCSI_SENSE_NOT_READY (0x4) and getting_ready (0x1), thereby communicating that LUN0 is not ready to initialize virtual disk 125. However, after storage controller 140 is ready, virtual disk 125 is still not discoverable until storage controller 150 is ready, and so OS interface 100 directs storage driver 130 to initialize storage controller 150 and initiates RAID discovery on storage device 155. Here, while waiting for the reply from storage controller 150, software RAID driver 120 issues a notification, such as a BUS_CHANGE_DETECTED for storage controller 140, to OS interface 110. In response, OS interface 110 will attempt to re-discover storage controller 140, thereby resetting the timeout for the discovery of virtual disk 125. Further, when storage controller 150 is initialized, but the RAID aspects of the initialization is not complete, software RAID controller 120 can again send the notification, thereby gaining additional time to completely enumerate all aspect of virtual disk 125 prior to a timeout. Finally, when both storage devices 145 and 155 are initialized, and virtual disk 125 is fully enumerated, then a final discovery process will complete the discovery process and OS interface 110 will correctly ascribe virtual disk 125. In the embodiment, where virtual disk 125 is provided with the LUN associated with one of storage devices 145 (LUN0) or 155 (LUN1), the final discovery of storage device 155 on storage controller 150 will result in the storage controller returning a reply, such as a STATUS_NO_DEVICE, thereby ensuring that software RAID controller 120 provides a monolithic view of the virtual disk through storage controller 140, that is, through LUN0.

The skilled artisan will recognize that information handling system 100 can include one or more additional storage controllers similar to storage controllers 140 and 150, and that each storage controller will operate to control one or more additional storage devices similar to storage devices 145 and 155. Further, the skilled artisan will recognize that, while illustrated as single storage devices, each of storage devices 145 and 155 can represent one or more additional storage device. As such, one or more of storage controllers 140 and 150, can themselves be RAID storage controllers that provide similar RAID functions to software RAID driver 120 within each storage controller's own set of storage devices. Moreover, the skilled artisan will recognize that virtual disk 125 can include one or more additional storage devices similar to storage devices 145 and 155 and that are associated with one or more additional storage controllers similar to storage controllers 140 and 150.

Figure 2:
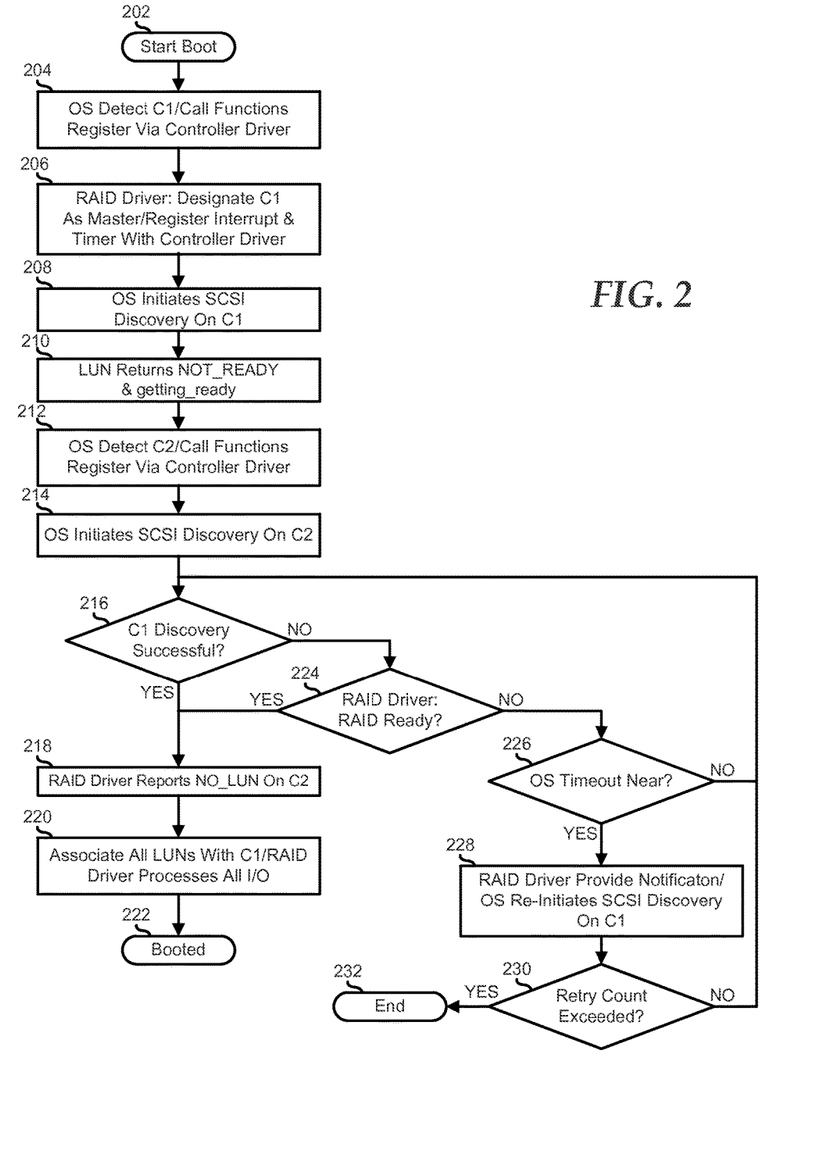
FIG. 2 illustrates a method of discovering a virtual disk spanned across independent storage controllers according to an embodiment of the present disclosure.

FIG. 2 illustrates a method for discovering a virtual disk spanned across independent storage controllers starting at block 202 where an information handling system such as information handling system 100 is booted. A OS interface of the information handling system detects a first storage controller and makes a call to the functions register of the first storage controller in block 204. For example, OS interface 110 can detect that storage controller 140 is present and that storage device 145 is present on the storage controller. In a particular embodiment, the OS interface calls the functions register of the first storage controller via a storage controller driver such as storage controller driver 130. Here, the OS interface operates to load the storage controller driver and the storage controller launches a discovery of installed storage controllers and attached storage devices, and reports the attached storage devices back to the OS interface. The OS interface launches a RAID driver, such as software RAID driver 120, and the RAID driver designates the first storage controller as the master controller for a pre-existing virtual disk, such as virtual disk 125, and registers interrupts and timers associated with the first storage controller with the storage controller driver in block 206. The OS interface initiates SCSI discovery on the first storage controller in block 208. For example, OS interface 110 can issue a SCSIOP_REPORT_LUNS command and a. SCSIOP_INQUIRY command to storage controller 140 through RAID driver 120. The RAID driver returns an indication that the LUN, that is, the attached storage device, is not ready in block 210. For example, storage controller 140 can provide a SCSIINFO SCSI_SENSE_NOT_READY (0x4) reply and a getting_ready (0x1) reply to OS interface 110 through software RAID driver 120.

The OS interface detects a second storage controller and makes a call to the functions register of the second storage controller in block 212. For example, OS interface 110 can detect that storage controller 150 is present and that storage device 155 is present on the storage controller. In a particular embodiment, the OS interface calls the functions register of the first storage controller via the storage controller driver. The OS interface initiates SCSI discovery on the second storage controller in block 214. For example, OS interface 110 can issue a SCSIOP_REPORT_LUNS command and a SCSIOP_INQUIRY command to storage controller 150 through RAID driver 120. A decision is made as to whether or not the discovery of the virtual disk was successful on the first storage controller in decision block 216. If so, the "YES" branch of decision block 216 is taken, the RAID driver reports no LUN on the second storage controller to the OS interface in block 218, all LUNs of the virtual disk are associate with the first storage controller and the RAID driver processes all I/O to the virtual disk in block 220, and the system boot is completed in block 222.

Returning to decision block 216, if the discovery of the virtual disk was not successful on the first storage controller, the "NO" branch is taken and a decision is made as to whether or not the RAID driver has indicated that the virtual disk is fully discovered on all storage controllers in decision block 224. If so, the method proceeds to block 218 where the RAID driver reports no LUN on the second storage controller to the OS interface. If the RAID driver has not indicated that the virtual disk is fully discovered on all storage controllers, the "NO" branch of decision block 224 is taken and a decision is made as to whether or not a OS timeout for discovering a virtual disk is imminent in decision block 226. If not, the "NO" branch of decision block 226 is taken and the method returns to decision block 216 where a decision is made as to whether or not the discovery of the virtual disk was successful on the first storage controller. If the OS timeout for discovering the virtual disk is imminent, the "YES" branch of decision block 226 is taken and the RAID driver provides a notification to the OS interface to reinitiate SCSI discovery on the first storage controller in block 228. For example, software RAID driver 120 can issue a BUS_GRANGE_DETECTED reply to OS interface 110. A decision is made as to whether or not a retry count is exceeded in decision block 230. For example, software RAID driver 120 can include a predetermined retry count, such that the notification is only provided to OS interface 110 a finite number of times, such as four (4), ten (10), one hundred (100), or another number of times, as needed or desired. If the retry count is not exceeded, the "NO" branch of decision block 230 is taken and the method returns to decision block 216 where a decision is made as to whether or not the discovery of the virtual disk was successful on the first storage controller. If the retry count is exceeded, the "YES" branch of decision block 230 is taken and the method ends in block 232. The skilled artisan will recognize that the method depicted in FIG. 2 can be adapted to virtual disks spanned across more than two storage controllers, as needed or desired.

Figure 3:
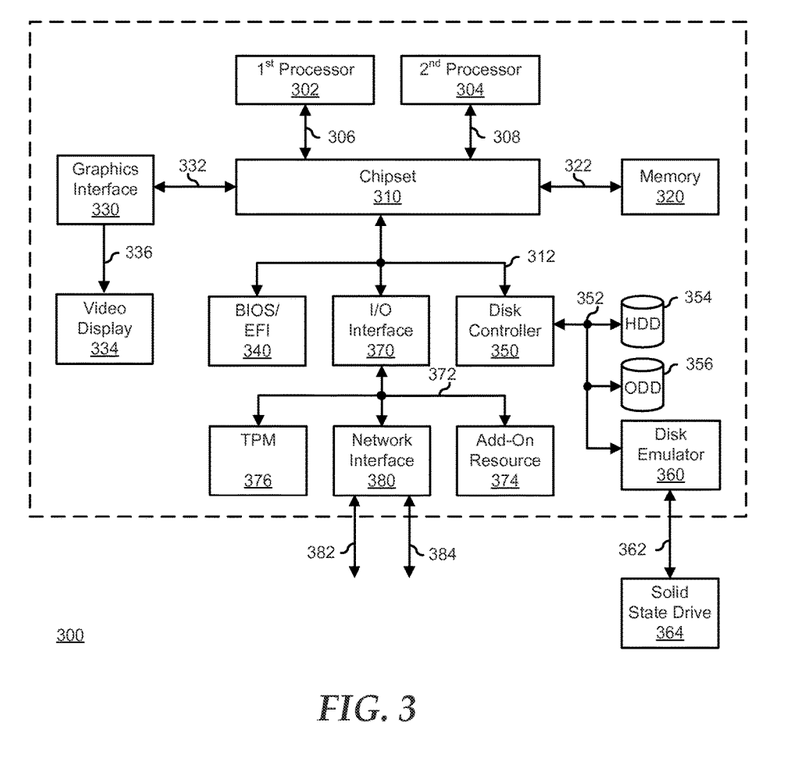
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-integrated Circuit (I$^2$C) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a first storage controller coupled to a first physical storage device;
   a second storage controller coupled to a second physical storage device, wherein the first physical storage device and the second physical storage device form a single virtual disk; and
   a processor configured to sequentially:
   1) initiate a first discovery of the first physical storage device;
   2) initiate a first discovery of the virtual disk on the first storage controller;
   3) complete the first discovery of the first physical storage device;
   4) initiate a first discovery of the second physical storage device;
   5) initiate a second discovery of the virtual disk on the second storage controller;
   6) determine that a first timeout for the first discovery of the virtual disk on the first storage controller will expire prior to completing the first discovery of the second physical storage device; and
   7) initiate a second discovery of the first physical storage device in response to determining that the timeout will expire.

2. The information handling system of claim 1, wherein the processor is further configured to:
   complete the second discovery of the first physical storage device;
   complete the first discovery of the second physical storage device;
   initiate a second discovery of the virtual disk on the first storage controller; and
   complete the second discovery of the virtual disk on the first storage controller.

3. The information handling system of claim 2, wherein the processor is further configured to:
   direct a command to access the virtual disk to the first storage controller in response to completing the second discovery of the virtual disk on the first storage controller.

4. The information handling system of claim 3, wherein the processor is further configured to:
   assign a Logical Unit Number (LUN) associated with the first physical storage device to the virtual disk in response to completing the second discovery of the virtual disk on the first storage controller.

5. The information handling system of claim 2, wherein the processor is further configured to:
   drop a command to access the second physical storage device in response to completing the second discovery of the virtual disk on the first storage controller.

6. The information handling system of claim 2, further comprising a storage controller driver and a Redundant Array of Independent Drives (RAID) driver, wherein the processor is further configured to:
   invoke the storage controller driver in initiating the first discovery of the first physical storage device and in initiating the first discovery of the first physical storage device; and
   invoke the RAID driver in initiating the first discovery of the virtual disk and in initiating the second discovery of the virtual disk.

7. The information handling system of claim 6, further comprising:
   an operating system (OS) interface, wherein, in response to determining that the first timeout will expire, the processor is further configured to provide a notification to the OS interface to initiate the second discovery of the first physical storage device.

8. The information handling system of claim 7, wherein the processor is further configured to:
   invoke the RAID driver in providing the notification.

9. A method, comprising:
   initiating, by a processor of an information handling system, a first discovery of a first physical storage device coupled to a first storage controller of the information handling system;
   then initiating, by the processor, a first discovery of a virtual disk of the information handling system on the first storage controller, wherein the virtual disk is formed by the first physical storage device and a second physical storage device coupled to a second physical storage controller of the information handling system;
   then completing the first discovery of the first physical storage device;
   then initiating a first discovery of the second physical storage device;
   then initiating a second discovery of the virtual disk on the second storage controller;
   then determining that a first timeout for the first discovery of the virtual disk on the first storage controller will expire prior to completing the first discovery of the second physical storage device; and
   then initiating a second discovery of the first physical storage device in response to determining that the timeout will expire.

10. The method of claim 9, further comprising:
completing the second discovery of the first physical storage device;
completing the first discovery of the second physical storage device;
initiating a second discovery of the virtual disk on the first storage controller; and
completing the second discovery of the virtual disk on the first storage controller.

11. The method of claim 10, further comprising:
directing a command to access the virtual disk to the first storage controller in response to completing the second discovery of the virtual disk on the first storage controller.

12. The method of claim 11, further comprising:
assigning a Logical Unit Number (LUN) associated with the first physical storage device to the virtual disk in response to completing the second discovery of the virtual disk on the first storage controller.

13. The method of claim 10, further comprising:
dropping a command to access the second physical storage device in response to completing the second discovery of the virtual disk on the first storage controller.

14. The method of claim 10, further comprising:
invoking a storage controller driver of the information handling system in initiating the first discovery of the first physical storage device and in initiating the first discovery of the first physical storage device; and
invoking a Redundant Array of Independent Drives (RAID) driver of the information handling system in initiating the first discovery of the virtual disk and in initiating the second discovery of the virtual disk.

15. The method of claim 14, further comprising:
providing a notification to an operating system interface of the information handling system to initiate the second discovery of the first physical storage device in response to determining that the first timeout will expire.

16. The method of claim 15, further comprising:
invoking the RAID driver in providing the notification.

17. A non-transitory computer-readable medium including code for performing a method, the method comprising:
initiating a first discovery of a first physical storage device coupled to a first storage controller;
then initiating a first discovery of a virtual disk on the first storage controller, wherein the virtual disk is formed by the first physical storage device and a second physical storage device coupled to a second storage controller;
then completing the first discovery of the first physical storage device;
then initiating a first discovery of the second physical storage device;
then initiating a second discovery of the virtual disk on the second storage controller;
then determining that a first timeout for the first discovery of the virtual disk on the first storage controller will expire prior to completing the first discovery of the second physical storage device; and
then initiating a second discovery of the first physical storage device in response to determining that the timeout will expire.

18. The computer-readable medium of claim 17, the method further comprising:
completing the second discovery of the first physical storage device;
completing the first discovery of the second physical storage device;
initiating a second discovery of the virtual disk on the first storage controller; and
completing the second discovery of the virtual disk on the first storage controller.

19. The computer-readable medium of claim 18, the method further comprising:
directing a command to access the virtual disk to the first storage controller in response to completing the second discovery of the virtual disk on the first storage controller.

20. The computer-readable medium of claim 19, the method further comprising:
assigning a Logical Unit Number (LUN) associated with the first physical storage device to the virtual disk in response to completing the second discovery of the virtual disk on the first storage controller.

* * * * *